Figure 1:
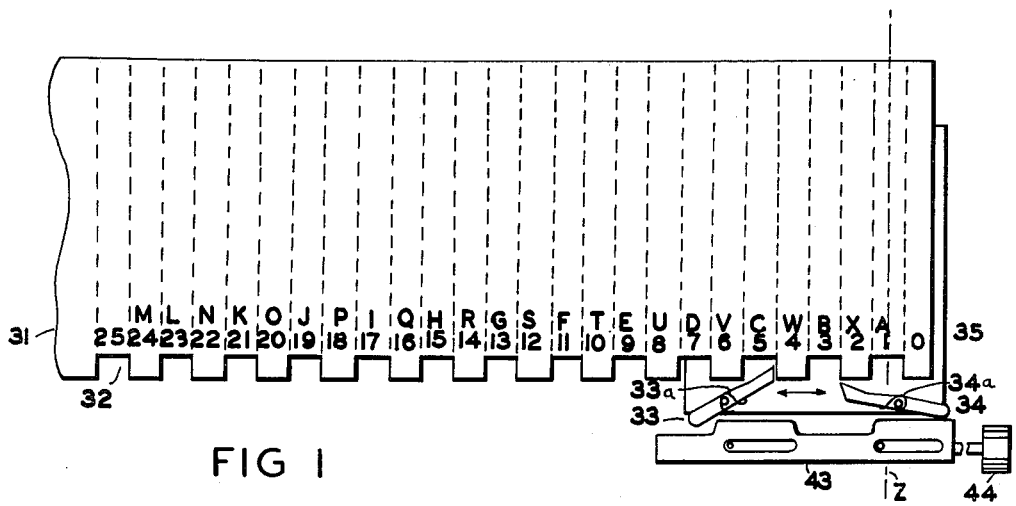

Nov. 9, 1965   H. J. WALTER   3,216,138
CONTINUOUS SEQUENCE SLIDE PROJECTOR MEANS
Original Filed Feb. 25, 1960   3 Sheets-Sheet 1

INVENTOR.
HENRY J. WALTER
BY James P. Malone

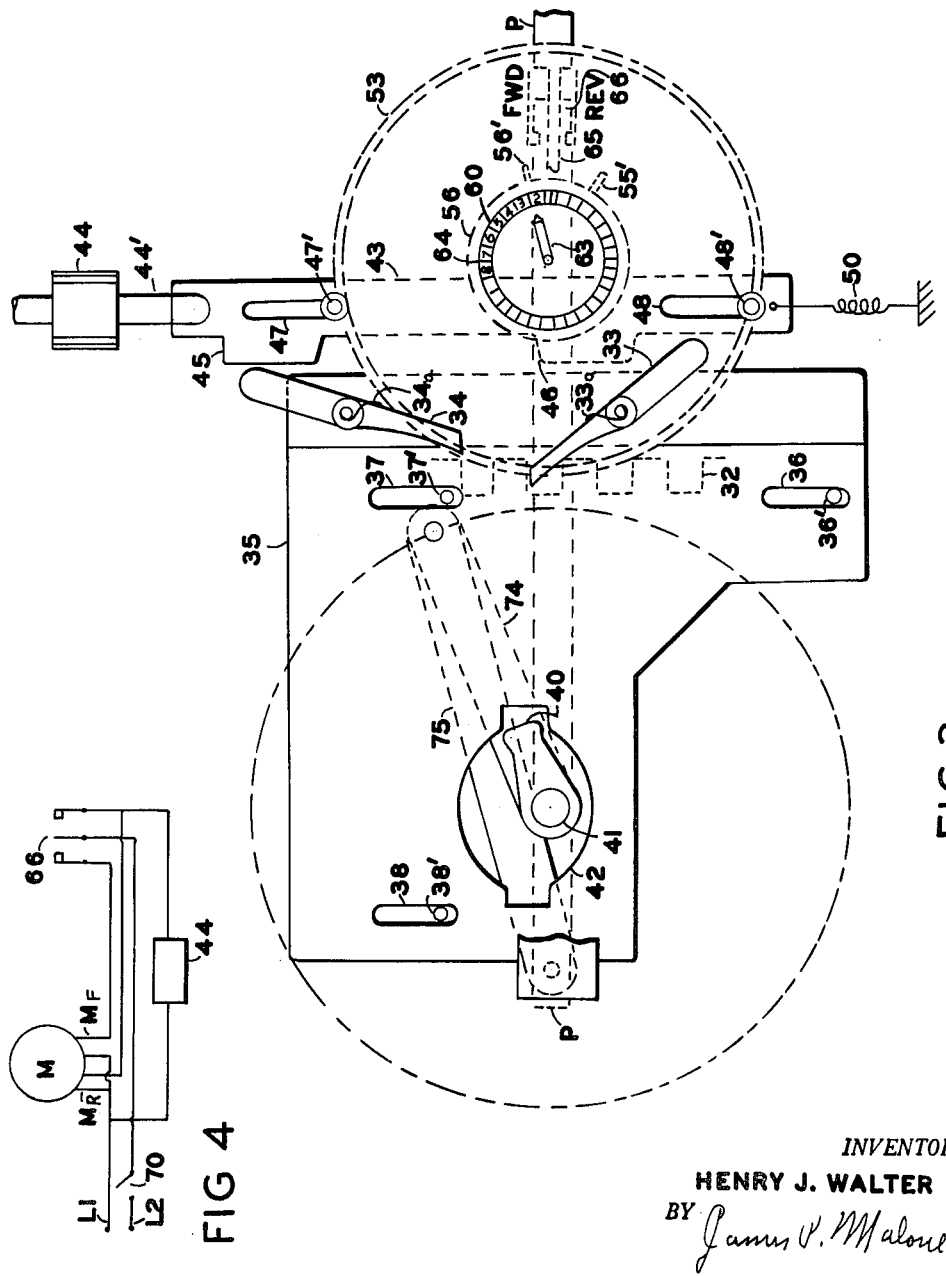

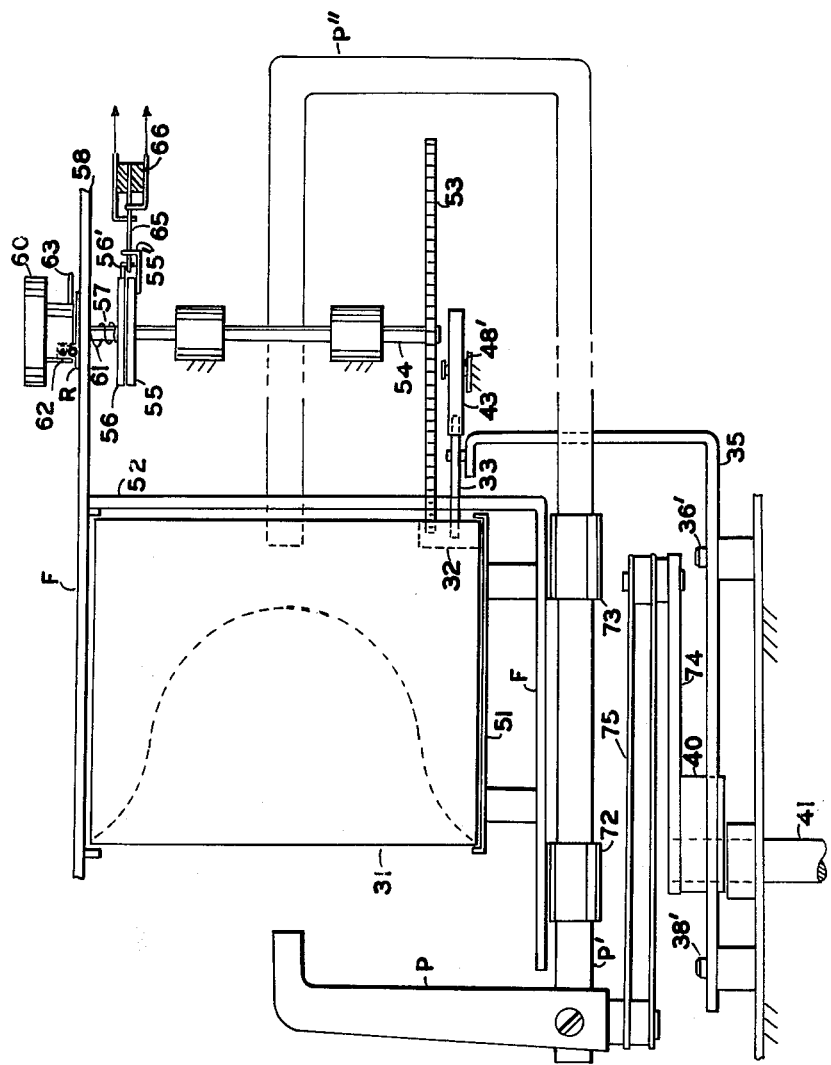

United States Patent Office 3,216,138
Patented Nov. 9, 1965

3,216,138
CONTINUOUS SEQUENCE SLIDE
PROJECTOR MEANS
Henry J. Walter, Bethpage, N.Y., assignor to
Viewlex, Inc., Holbrook, N.Y.
Continuation of application Ser. No. 10,985, Feb. 25,
1960. This application June 1, 1962, Ser. No. 199,532
1 Claim. (Cl. 40—36)

This application is a continuation of my co-pending application of the same title, Serial No. 10,985, filed February 25, 1960, and now abandoned.

This invention relates to slide projectors and more particularly to such means adapted to project a predetermined sequence of slides continuously and repeatedly without any interruption.

Conventional slide projectors of the type using straight magazines show a series of slides automatically. However, to repeat the sequence, the magazine must be returned manually from its last to its first slide position. These projectors are not suitable for the continuous and repeated showing of a predetermined sequence, for instance in automatic advertising devices, especially where an audible commentary is provided on a tape or record in synchronism with the showing. In order to use conventional slide projectors for this type operation a considerable mechanical redesign would be required and there would be a considerable interruption while the magazine was returned from the first to the last position.

The present invention solves this difficulty by interlacing the slides and reversing half-way through the sequence so that when the sequence is finished the first position of the magazine is again in viewing position. For instance, slides A, B, C, D, etc. are put in slots 1, 3, 5, 7, etc. of the magazine and succeeding slides V, W, X, etc. are put in slots 6, 4, 2 of the magazine. The magazine automatically reverses after showing slide D so that after showing the last slide it would only be one step away from the first slide, for repeating the sequence.

The magazine of the present invention is transported by a pair of pawls, one for each direction, which are mounted on a transport arm which moves two steps or magazine slots each cycle. The pawls are positioned on the transport arm so that one step is lost on each reversal so that the forward moving pawl will index odd numbered slots in the magazine and the reverse moving pawl will index even numbered slots in the magazine to the viewing position, in order to provide the proper sequence. The transport arm or plate is driven by a cam which reciprocates the plate. The pawl not being used is cammed out of operative position. Adjustable control means are provided to show any odd number of slides in continuous and repeated sequence.

Accordingly, a principal object of the invention is to provide new and improved slide projector means.

Another object of the invention is to provide new and improved slide projector means for showing continuous sequences repeatedly.

Another object of the invention is to provide new and improved slide projector means for showing continuous sequences repeatedly, wherein the slides are interlaced in the magazine.

Another object of the invention is to provide new and improved slide projector means for showing continuous sequences repeatedly, wherein the slides are interlaced in the magazine, and means to transport the magazine.

Another object of the invention is to provide new and improved slide projector means for showing continuous sequences repeatedly, wherein the slides are interlaced in the magazine, and means to transport the magazine, comprising a pair of pawls mounted on a transport arm.

Another object of the invention is to provide new and improved slide projector means for showing a predetermined sequence of interlaced slides, including means to set the apparatus for any convenient number of slides.

Figure 5:
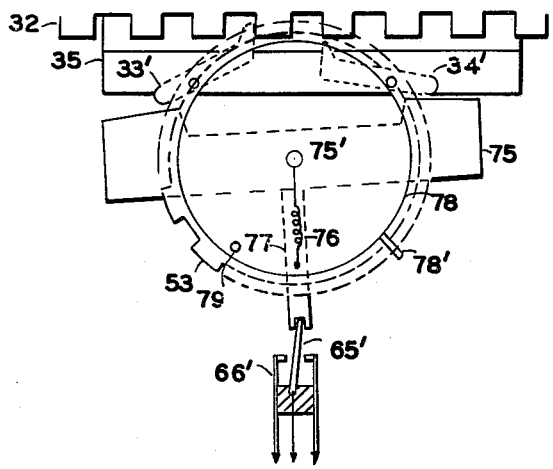
Figure 6:
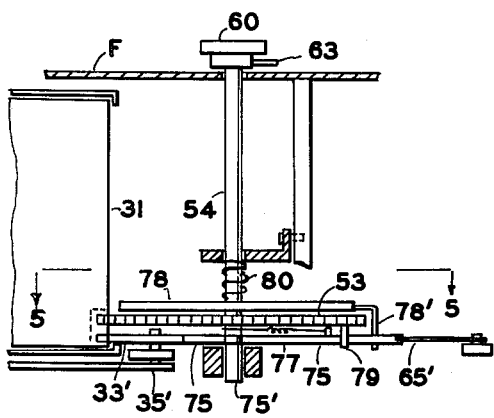

These and other objects of the invention will be apparent from the following specification and drawings, of which FIG. 1 is an illustrative schematic view showing the operation of the invention, FIG. 2 is a plan view of an embodiment of the invention, FIG. 3 is an elevation view partially in section of the embodiment of FIG. 2, FIG. 4 is a schematic circuit diagram, FIG. 5 is a plan detail partly sectional view of a modification of the invention, and FIG. 6 is an elevation view partially in section of the modification of FIG. 5.

Referring to FIG. 1 there is shown a slide magazine 31 of the type having a rack 32 of teeth which are used for transporting the magazine. The magazine has a plurality of slots for the slides which are numbered from 1 to 24. The slides are placed in the magazine in interlaced position. For instance, slides A, B, C and D are placed in slots 1, 3, 5, 7 and slides V, W, X are placed in slots 6, 4, 2. In the sequence illustrated, the magazine would be transported to show the slides in alphabetical order, the magazine being automatically reversed after showing a predetermined number of slides. In order to provide this motion, it is necessary to transport the magazine two positions each cycle and also to lose one position on each reversal. This motion is provided by a pair of pawls 33 and 34 which are spring loaded by springs 33a and 34a. The pawls are mounted on transport arm 35 which has a reciprocating motion in the direction of the arrows.

Assume the dotted line Z defines the viewing position. After slide A in slot 1 is viewed, then pawl 33 will move the magazine two positions to the right from the illustrated position placing slot 3 and slide B into viewing position. The reverse pawl 34 is cammed out of action by cam 43 as will be discussed. Succeeding cycles will index all of the odd numbered slots of the magazine into viewing position Z. After the slide L in slot 23 has been viewed the operation of the magazine will index forward to slot 25 and will be automatically reversed, the forward moving pawl 33 will be cammed out of operation by cam 43 and the reverse moving pawl 34 will be released. The pawls are situated so that upon reversal before the pawl 34 contacts the side of a tooth half of the motion of plate 35 will be lost so that the next position indexed would be slot 24. Upon reversal, either pawl will move one magazine position without engaging the magazine and therefore moves the magazine only one position on the first reversal stroke. On the next cycle the magazine will be indexed the full two positions so that the slot 22 is moved into viewing position and so on, so that all the even number slots will be indexed into viewing position.

After slide X in slot 2 has been viewed the reverse pawl indexes to the position labeled O. The mechanism is then reversed, as will be discussed, and the forward pawl 33 again takes over. It loses one position before it contacts a tooth so that the next position indexed is slot 1 which begins the sequence again.

Therefore, the sequence may be repeated without any interruption for manually or otherwise moving the magazine from the last to the first position and without the additional mechanisms necessary for such operation.

FIG. 2 shows one embodiment of the actuating mechanism. It comprises a pair of pawls 33 and 34 mounted on transport plate or arm 35. The pawls are spring loaded in the direction to engage the teeth of rack 32 by means of springs 33a and 34a. The plate 35 is mounted in the frame for reciprocating motion by means of the slots 36, 37, 38 in the plate 35, which engage the pins 36', 37' and 38' mounted on a flat portion of the frame F upon which the plate 35 slides. The reciprocating motion of the plate 35 is provided by means of the rotary cam 40 which is mounted on motor driven shaft 41 and which rides in the cam cutout 42 in the plate 35. Therefore, as the cam 40 rotates it will reciprocate the transport plate 35. The magnitude of the motion is chosen to be two magazine slots. In the position shown in FIG. 2 the cam 40 is moving counter clockwise and has just indexed the magazine with pawl 33. The cam cutout 42 is symmetrical and the magazine is indexed when cam arm 40 contacts the flat sides of the cutout 42 adjacent slots 36, 37 while pusher P is retracted from the magazine. The pawls are retracted when the cam arm 40 contacts the flat sides of cutout 42 adjacent slot 38.

The pawl 34 which is not being used is cammed out of operation by means of the cam 43 which is operated by the solenoid 44. The cam 43 has a pair of raised portions 45, 46 and a pair of slots 47, 48 which engage a pair of pins 47', 48' mounted on a flat portion of the frame upon which the cam 43 slides. The cam 43 is spring loaded in one direction by means of the spring 50 and operated in the other direction by means of the solenoid 44 and arm 44' depending upon which pawl is being used.

FIG. 3 shows a detail side view of the embodiment of FIG. 2 showing the transport arm 35 upon which are mounted the pawls 33, 34 which engage the rack 32 of teeth in the magazine 31. The transport arm 35 is actuated by the cam 40 mounted on shaft 41 which is driven by the motor M (FIG. 4). The pawl control cam 43 is slidably mounted on the frame by means of the pins 47' and 48'.

Therefore, as the transport arm 35 is reciprocated in and out of the plane of the paper the magazine 31 is also moved in one direction along the magazine track comprising the track portions 51, 52 on frame F.

Additional control means are provided so that any odd number of slides may be shown. These means comprise a selector gear 53 which is mounted on shaft 54 which is journalled to the frame, the gear 53 engaging the rack 32. On top of the shaft 54 is mounted a control disc 55. Above the disc 55 is mounted another control disc 56 which is mounted on shaft 57 which is journalled to the top frame 58. A knob 60 is mounted on top of the shaft 57 and the disc 56 is spring loaded against the disc 55 by means of the spring 61 so that the two discs 55 and 56 form a clutch which may be disconnected by lifting the knob 60 against the spring 61 pressure. The knob 60 has a detent member 62 which may be a spring loaded ball riding on a circular ring R of indentations corresponding to the number of positions in a magazine. Knob 60 also preferably has a pointer 63 to indicate the desired number of slides on a calibrated dial 64 which indicates the number of forward slide positions. The disc 55 has a pin 55' and the disc 56 has a pin 56' which are adapted to contact the actuator blade 65 from either direction to trip the toggle switch 66 in forward and reverse directions as desired. The toggle means may be conventional, for instance, by making the mounting arm 65 as a snap action spring having two positions. The toggle switch 66 is connected to operate a reversible motor, as shown in the circuit diagram of FIG. 4. The reversing will occur when cam arm 40 has just completed a movement of the magazine.

Referring to FIG. 4 the motor M is of the reversible type either with separate windings or by other conventional means. Winding $M_F$ of the motor is connected across the line L1, L2 through one side of the toggle switch 60 and the other winding $M_R$ of the motor is connected across the line through the other side of the toggle switch 66. The solenoid 44 is connected across the line through one side of the switch 66 which would be the forward position in the arrangement illustrated in FIG. 2 in which the solenoid 44 operates the cam 43 to move the reverse pawl 34 out of operation.

The operation of the control means of FIG. 3 is as follows:

Set up and adjust machine so that the magazine is in position with slot 1 in viewing position with selector gear 53 and connected pin 55' in the position putting the blade 65 of the toggle switch to forward contact position. In order to select the number of slides the knob 60 is lifted against the spring 57 pressure and the pointer 63 set on the calibrated scale to the desired number of slides to be shown during the forward moving portion of the cycle. This will set the pin 56' on disc 56 to the desired number of slide positions.

The apparatus is then started by closing the operation switch 70 which will cause the magazine to be transported into the plane of the paper in FIG. 3. As the magazine is transported, the pin 56' on disc 56 will rotate around per the predetermined number of slides and will trip the toggle switch 66 into the reverse direction, whereupon the motor M will reverse and transport the magazine in the opposite direction. When the toggle switch 66 is thrown to the reverse position the solenoid 44 is deenergized and the cam 43 is actuated by the spring 50 to change the pawls as previously discussed.

Conventional means are provided for pushing the slides in and out of the magazine. These comprise the pusher bar P, P', P'' which reciprocates in frame guides 72 and 73. The pusher bar is actuated by the motor driven shaft 41 by means of a linkage comprising the arm 74 which is fixedly connected to the motor shaft at one end and pivotally connected to the arm 75 at its other end. The other end of the arm 75 is pivotally connected to the pusher member P so that as the motor driven shaft 41 rotates the pusher P is actuated and reciprocates to move the slides in and out of the magazine to viewing position in conventional manner. The motion of the slides in and out of the magazine is synchronized with the transporting of the magazine so that the transporting of the magazine is done when the pusher P is in retracted position to avoid mechanical interference with the magazine. The speed and cam arrangement are chosen for a desired viewing time. A timer may be added to actuate switch 70 if desired, to vary viewing time.

FIGS. 5 and 6 show another modification of the transport means which eliminates the use of the solenoid 44. In this modification the pawl control cam 75 does not reciprocate but is pivotally mounted loosely on shaft 75' and operates preferably as a toggle device by means of the spring 76 connected between portion 77 of cam 75 and shaft 75'. The spring pulls cam 75 into left or right position. The cam 75 or switch 66' or preferably both are snap action toggle devices which snap to either of two positions. When the cam 75 is in one position, as shown, it cams one of the pawls 34' on plate 35 out of operative position and vice versa with pawl 33'. The tail portion 77 on cam 75 operates the actuator blade 65' of the toggle switch 66'. Selector gear 53 is mounted on shaft 75'.

Referring to FIG. 6 the cam 75 is operated by pins 78' mounted on the disc 78 and pin 79 mounted on the selector gear 53, in similar manner to the operation discussed in connection with FIG. 3. In FIG. 6 the disc 78 on shaft 54 is spring loaded down against the selector gear 53 by means of the spring 80 forming a clutch.

The operation of this embodiment is as follows: The machine is set up with selector gear pin 79 in the position putting cam 75 and the blade 65' of switch 66' in forward contact position, and slot 1 of the magazine being in viewing position. The knob 60 is then pulled out and set to the desired number of slides on the forward portion of the cycle which sets the reverse disc 78 and pin 78' for the proper number of slides. The knob and scale are the same as shown in FIGS. 3 and 4.

The main switch 70 is then thrown to start the operation. The circuit is the same as FIG. 4 except solenoid 44 is omitted. The magazine will move forward into the plane of the paper in FIG. 6 for the desired number of forward slides until the disc 78 rotates around and the pin 78' connected thereto throws the cam 75 into reverse direction which in turn throws the toggle switch 66' into reverse position, whereupon the magazine will be moved in a reverse direction until the pin 79 on the selector gear 53 actuates the cam 75 into the forward position again to repeat the cycle.

Many modifications may be made by those who desire to practice the invention without departing from the scope thereof which is defined by the following claim.

I claim:

A slide projector of the type having a straight magazine adapted to be moved longitudinally and horizontal pusher means to move slides to and from said magazine to a viewing position in a direction perpendicular to the direction of movement of said magazine, said magazine having slides interlaced in a predetermined sequence, means to transport said magazine longitudinally to show said predetermined sequence of slides in repetitive manner, comprising a horizontally slidable transport arm, forward and reverse pawls mounted on said arm, means to move said transport arm two magazine positions, each movement comprising a rotary cam connected to said pusher means, reversible motor means to rotate said cam, a cam cutout in said transport arm, said cam being connected to ride in said cutout to reciprocate said transport arm, long cam means to operate said pawls to reverse the movement of said magazine, solenoid means connected to control said long cam, said pawls being spaced on said cam to lose one magazine position on each reversal whereby said interlaced slides are shown in sequence, a linkage connecting said cam to said horizontal pusher, said horizontal pusher having two opposing arms adapted to push a slide to and from said magazine under positive control in both directions, and calibrated adjustable means to reverse the direction of magazine travel to project sequences of slides of the full capacity and substantially less than the full capacity of the magazine, comprising a calibrated selector knob journaled to the frame of said projector, an adjustable clutch connected to said knob including a pair of pins selectively positionable, a reversing switch, said pins being adapted to contact said reversing switch, said switch being connected to reverse said motor and said solenoid.

References Cited by the Examiner
UNITED STATES PATENTS

| | | | |
|---|---|---|---|
| 239,910 | 4/81 | Woolston | 40—78 |
| 773,786 | 11/04 | Colardeau et al. | 40—79 X |
| 940,479 | 11/09 | Richard | 88—28 X |
| 1,325,825 | 12/19 | Bailey | 88—28 X |
| 2,732,758 | 1/56 | Waller | 40—79 X |
| 2,874,497 | 2/59 | Huff et al. | 40—79 |
| 3,023,669 | 3/62 | Hall | 88—28 |

FOREIGN PATENTS 190,287   4/37   Switzerland.

JEROME SCHNALL, *Primary Examiner.*